No. 683,317. Patented Sept. 24, 1901.
J. McBOYLE.
HOSE NOZZLE.
(Application filed May 7, 1901.)
(No Model.)
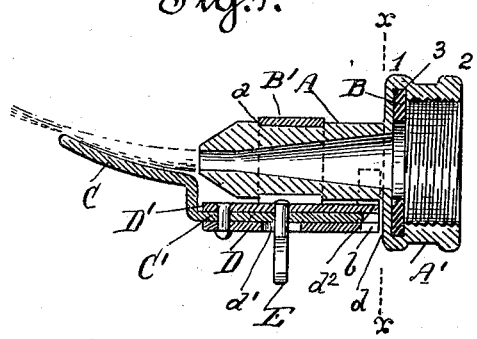
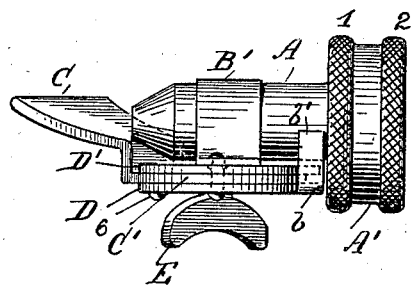
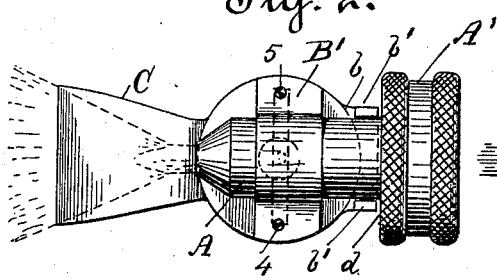
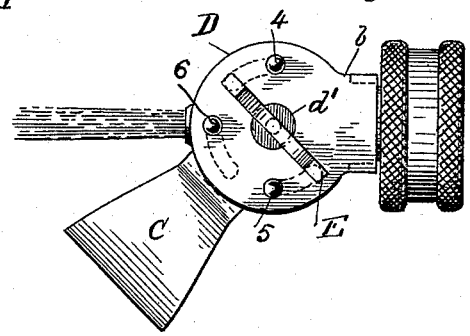
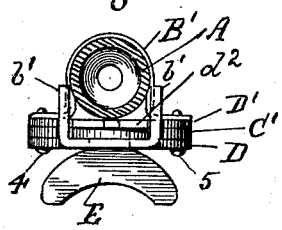
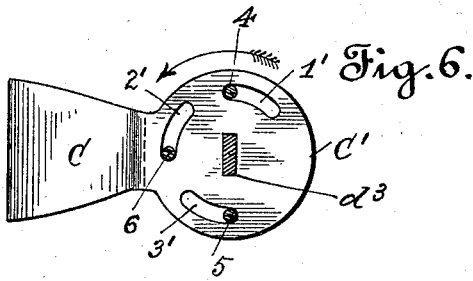
Witnesses.
Inventor.
Joseph McBoyle
by N. Acker
his atty.

UNITED STATES PATENT OFFICE.

JOSEPH McBOYLE, OF OAKLAND, CALIFORNIA.

HOSE-NOZZLE.

SPECIFICATION forming part of Letters Patent No. 683,317, dated September 24, 1901.

Application filed May 7, 1901. Serial No. 59,125. (No model.)

*To all whom it may concern:*

Be it known that I, JOSEPH MCBOYLE, a citizen of the United States, residing at Oakland, county of Alameda, State of California, have invented certain new and useful Improvements in Hose-Nozzles; and I do hereby declare the following to be a full, clear, and exact description of the same.

The present invention relates to a certain new and useful improvement in that class of nozzles used for attachment to hose for lawn-sprinkling purposes or to any form of hose where the water is discharged therefrom in a solid or compact stream; and the object of the invention is to provide a nozzle so constructed as to permit of a solid stream being thrown thereby or by means of which the solid stream may be broken and the water be sprayed; and a further object of the invention is to so arrange the interior of the nozzle shell or body as to provide a countersunk seat for the coupling-washer, so that the washer will not be lost or separated from the nozzle during handling while detached from the hose.

To understand the invention, reference should be had to the accompanying sheet of drawings, wherein—

Figure 1 is a longitudinal sectional view; Fig. 2, a top plan view of the nozzle, showing the position of the spray-plate to spray the stream. Fig. 3 is a side view in elevation; Fig. 4, a bottom plan view illustrating the spray-plate out of line with the stream. Fig. 5 is a vertical sectional view, in end elevation, on line $x\, x$, Fig. 1; and Fig. 6 is a plan view of the spray-plate and its rotatable disk.

In the drawings the letter A is used to indicate the nozzle-tube, and A' the internally-screw-threaded body portion thereof. For convenience in attaching the nozzle to the coupling of the hose the body portion is formed with the two outer circular milled ridges 1 2. The interior surface of ridge 1 is cut away in order to form a countersunk seat 3 for the reception of the coupling-washer B. The washer being thus held within the body portion of the nozzle it cannot drop from its seat or become lost as the nozzle is detached from the hose-coupling.

The tube portion A of the nozzle is formed with an external seat $a$, which accommodates a band B' and prevents the same slipping endwise, although left free to turn or rotate therein. By means of this band the spray-plate C is held to the nozzle-tube portion, which is held a slight distance in advance of the discharge end of the nozzle. This spray-plate stands at an upward inclination, and it is attached at its lower end to the rotatable disk C'. The said disk C' is fitted or lies between the upper and lower plates D D'. The lower plate D is circular in form, excepting for the projecting end $b$, which end piece is formed with the upwardly-extending side walls or uprights $b'$. These uprights embrace the sides of the nozzle-tube and act as a strengthening-support for the lower plate D. The upper plate D' is shaped to conform to that of the plate D and disk C' and is provided with an extension-piece $d^2$. Said extension-piece fits between the uprights $b'$ and abuts against the wall $d$ of the enlarged body portion A' of the nozzle. The rotatable disk is formed with the openings or slots 1' 2' 3', through which pass the rivets 4 5 6, used to unite the upper and lower plates D D'. The rivets 4 and 5 also serve to unite the clamp-band B' to the upper plate D' and to secure the same within its seat $a$. By this means of connection the entire spray attachment of the nozzle may be turned upon the nozzle-tube, thus permitting the spray-plate being brought into position below the discharge end of the nozzle-tube A. Without such movement being provided for it would be almost impossible to secure proper position for the spray-plate and at the same time insure the nozzle being tightly screwed onto the hose-coupling, for the same number of turns will not answer in all cases to attach the nozzle.

In the bottom plate D is formed an opening $d'$, through which the shank of the thumb-nut E passes. The inner square end of this thumb-nut passes through a slot $d^3$ in the disk C' and is then loosely riveted to the upper plate D'. By means of the thumb-nut a part rotation may be given to the disk C' in order to turn the spray-plate in or out of line with the solid stream of water discharged from the nozzle. The turn or lateral movement permitted the rotatable disk of the spray-plate is limited by the length of the slots 1' 2' 3' cut therein, for as the fixed rivets pass therethrough the movement of the disk ceases the moment the ends of the slots bear against the said rivets. The projecting head of the thumb-nut answers as a support by means of which the nozzle is held at a slight upward inclination while resting upon the ground. It is obvious that by turning the thumb-nut to the right or left the spray-plate is placed out of or in line with the stream of water. When in line, the solid stream impinges thereagainst and is diverted upward, and thus converted into a fan-shaped spray. If not desired to spray the stream, the spray-plate is turned to one side, so as to be out of line with the jet of water and the same permitted to issue in a solid stream.

Having thus described the invention, what is claimed as new, and desired to be protected by Letters Patent, is—

1. In a spray-nozzle for water-hose, the combination with the enlarged body portion, of a nozzle-tube extending therefrom, a seat formed on the exterior of said nozzle-tube, a band loosely fitted therein, an upper and lower plate secured to said band, a disk rotatably held between said plates, an inclined spray-plate extending from said disk in advance of the nozzle-tube, and means whereby the rotary movement is imparted to the rotatable disk in order to give lateral movement to the spray-plate.

2. In a spray-nozzle for water-hose, the combination with the body portion thereof, of a nozzle-tube extending therefrom, a seat formed on the exterior of said nozzle-tube, a band loosely fitted within the said seat so as to permit of the nozzle-tube turning freely within the band, a disk rotatably secured to the band, an inclined spray-plate extending from said disk in advance of the discharge end of the nozzle-tube, and means whereby rotary movement is imparted to the said disk in order to give lateral movement to the spray-plate so as to place the same in or out of the stream discharged from the spray-nozzle.

In witness whereof I have hereunto set my hand.

JOSEPH McBOYLE.

Witnesses:
N. A. ACKER,
WALTER F. VANE.